United States Patent Office 3,549,400
Patented Dec. 22, 1970

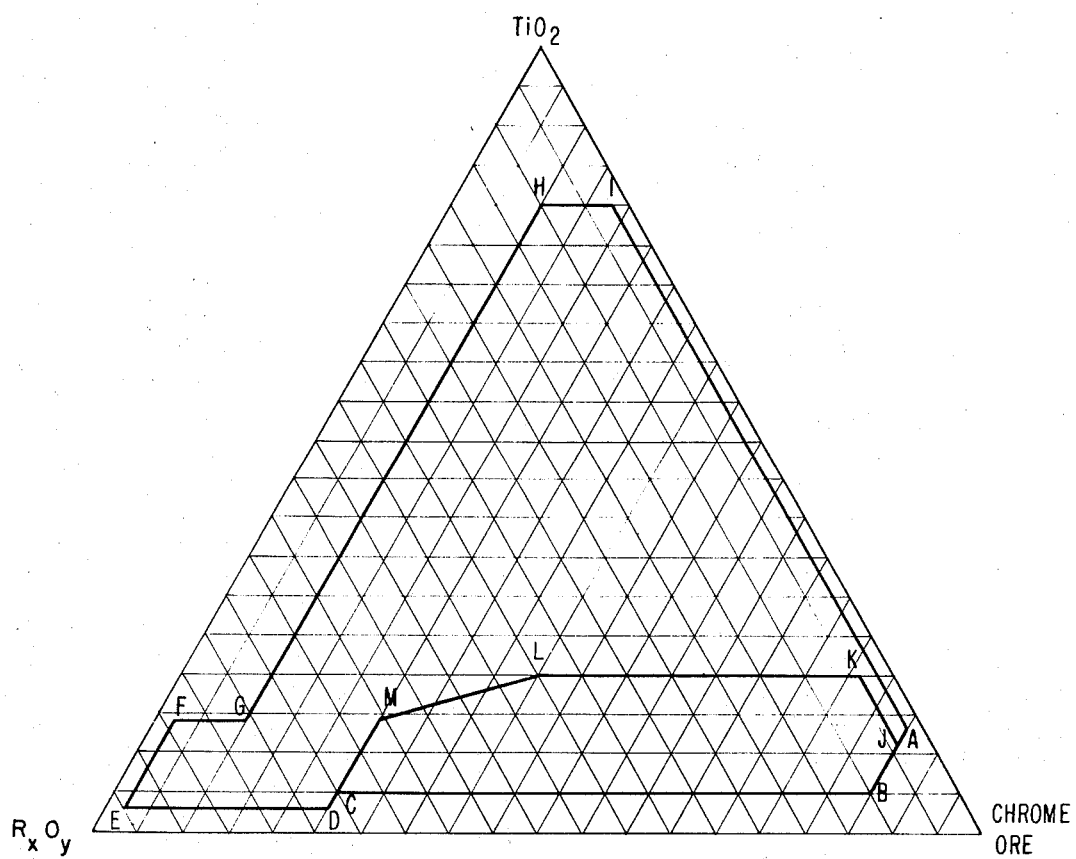

3,549,400
THERMAL SHOCK RESISTANT
CERAMIC MATERIAL
Irwin M. Lachman, Corning, N.Y., assignor to Corning Glass Works, Corning, N.Y., a corporation of New York
Filed Sept. 15, 1967, Ser. No. 668,027
Int. Cl. C04l 35/42
U.S. Cl. 106—59                              4 Claims

ABSTRACT OF THE DISCLOSURE

Ceramic bodies composed of a plurality of phases having markedly different coefficients of thermal expansion. The ceramic bodies are characterized by grain boundary and intracrystalline cracking. The ceramics have compositions which fall within the area and along the boundaries defined by FIG. A, B, C, D, E, F, G, H, I on the accompanying ternary compositional diagram of the system $R_xO_y$—$TiO_2$-Chrome Ore. Compositions within the area of FIG. J, K, L, M, N, C, B are preferred. $R_xO_y$ is selected from: (1) $Al_2O_3$, (2) $Al_2O_3+Fe_2O_3$ where $Fe_2O_3$ does not exceed 44.0 wt. percent, (3) $Al_2O_3+ZnO$ where ZnO does not exceed 90.6 wt. percent, and (4) $Al_2O_3+Fe_2O_3+ZnO$ where $Fe_2O_3$ does not exceed 44.0 wt. percent and ZnO does not exceed 90.6 wt. percent. Articles are made by molding, pressing or otherwise forming raw material powders and then firing in the sintering range of the materials in an oxidizing atmosphere. Preferred products are liners for exhaust manifolds to facilitate complete combustion of exhaust gases from internal combustion engines or the like and thereby reduce air pollution.

BACKGROUND OF THE INVENTION (1) Field of the invention

The present invention relates to thermal shock resistant ceramics of the ternary composition system $R_xO_y$—$TiO_2$-Chrome Ore and articles formed therefrom, especially liners for exhaust manifolds or the like.

(2) Description of the prior art

The prior art discloses numerous ceramic compositions, but most are not sufficiently resistant to extreme thermal shock. Materials are presently being sought to serve as liners for automobile exhaust manifolds, so that the temperature in the manifold may be kept sufficiently high to permit substantially complete combustion of residual hydrocarbons, thereby reducing air-pollution.

In extreme conditions, an auto manifold liner at subfreezing temperatures may suddenly be exposed to hot exhaust gases at 1400° C. In addition to the ability to resist severe thermal shock, the ceramic must also be sufficiently refractory to withstand temperatures on the order of 1400° C., and must have adequate resistance to chemical corrosion by the hot exhaust gases.

Prior art ceramics have generally failed with respect to one or more of these properties.

Therefore, the object of the present invention is to provide ceramic materials capable of resisting severe thermal shock and having sufficient refractoriness and corrosion resistance to withstand contact with hot exhaust gases. A collateral object is to provide ceramic material having the foregoing properties which can be readily fabricated into a variety of desired structural shapes.

SUMMARY OF THE INVENTION

It has now been discovered that certain ceramic compositions of the $R_xO_y$—$TiO_2$-Chrome Ore system provide articles which possess unique thermal shock characteristics. The compositions of the invention are within the area and along the boundaries defined by FIG. A, B, C, D, E, F, G, H, I on the ternary compositional diagram of the accompanying drawing where $R_xO_y$ is selected from: (1) $Al_2O_3$, (2) $Al_2O_3+Fe_2O_3$ where $Fe_2O_3$ does not exceed 44.0 wt. percent, (3) $Al_2O_3+ZnO$ where ZnO does not exceed 90.6 wt. percent, and (4) $Al_2O_3+Fe_2O_3+ZnO$ where $Fe_2O_3$ does not exceed 44.0 wt. percent and ZnO does not exceed 90.6 wt. percent. The preferred compositions are along the boundaries and within the area of FIG. J, K, L, M, C, B of the drawing where $R_xO_y$ is selected from: (1) $Al_2O_3$, (2) $Al_2O_3+Fe_2O_3$ does not exceed 41.5 wt. percent, (3) $Al_2O_3+ZnO$ where ZnO does not exceed 62.9 wt. percent, and (4) $Al_2O_3+Fe_2O_3+ZnO$ where $Fe_2O_3$ does not exceed 41.5 wt. percent and ZnO does not exceed 62.9 wt. percent.

BRIEF DESCRIPTION OF THE DRAWING

The drawing comprises a ternary compositional diagram of the system $R_xO_y$—$TiO_2$-Chrome Ore on which the compositional limits of the ceramics of the invention are indicated by the areas within and along the boundaries defined by FIG. A, B, C, D, E, F, G, H, I and FIG. J, K, L, M, C, B.

DETAILED DESCRIPTION OF THE INVENTION

The ceramics of the invention have compositions falling within the area and along the boundaries defined by FIG. A, B, C, D, E, F, G, H and preferably within the area of FIG. J, K, L, M, C, B of the ternary compositional diagram of the $R_xO_y$—TiO-Chrome Ore system which appears in the accompanying drawing.

In the compositions, $Al_2O_3$ may be replaced by up to 44.0 wt. percent $Fe_2O_3$ or 90.6 wt. percent ZnO on a one weight percent for one weight percent basis. In preferred compositions, $Al_2O_3$ may be replaced by up to 41.5 wt. percent $Fe_2O_3$ or 62.9 wt. percent ZnO on a one weight percent for one weight percent basis. Thus, $R_xO_y$ can be selected from the group consisting of: (1) $Al_2O_3$, (2) $Al_2O_3+Fe_2O_3$ where $Fe_2O_3$ does not exceed 44.0 wt. percent, (3) $Al_2O_3+ZnO$ where ZnO does not exceed 90.6 wt. percent, and (4) $Al_2O_3+Fe_2O_3+ZnO$ where $Fe_2O_3$ does not exceed 44.0 wt. percent and ZnO does not exceed 90.6 wt. percent.

The compositions at the points of the figures are as follows:

| | Weight, percent | | |
|---|---|---|---|
| | $Al_2O_3$ | $TiO_2$ | Chrome ore |
| Point: | | | |
| A | 2 | 13 | 85 |
| B | 10 | 5 | 85 |
| C | 70 | 5 | 25 |
| D | 72 | 3 | 25 |
| E | 95 | 3 | 2 |
| F | 84 | 14 | 2 |
| G | 76 | 14 | 10 |
| H | 10 | 80 | 10 |
| I | 2 | 80 | 18 |
| J | 4 | 11 | 85 |
| K | 4 | 20 | 76 |
| L | 40 | 20 | 40 |
| M | 61 | 14 | 25 |

Microscopic observation of the compositions falling within the scope of this invention shows the presence of intracrystalline and grain boundary cracking and these compositions are thermal shock resistant. Other compositions made up from the same raw materials and in the same way, do not show intracrystalline and grain boundary cracking and are not thermal shock resistant.

The ceramics of the present invention may be prepared from readily available oxide components. For example, suitable ceramics can be prepared from raw materials, such as, Alcoa A-2, $Al_2O_3$, (—325 mesh), Frit Makers $TiO_2$ from Titanium Alloy Mfg. Co., and Chrome Ore from any of a number of sources.

Chrome ore generally has the following composition, depending on source:

| | Weight percent |
|---|---|
| $Cr_2O_3$ | From about 30 to 65. |
| FeO | From about 2 to 26. |
| $Al_2O_3$ | From about 9 to 29. |
| MgO | From about 11 to 19. |
| $SiO_2$ | Up to about 5. |
| CaO | Up to about 0.5. |
| $TiO_2$ | Up to about 1. |

Specific chrome ore raw materials have the following analyses on a percent by weight basis, identified by source:

| | Allied chem. solvay chrome | Iranian chrome ore | Low Silica chrome ore | Transvaal chrome ore | Turkish chrome ore | Cuban chrome ore | Philippine chrome ore |
|---|---|---|---|---|---|---|---|
| $Cr_2O_3$ | 61 | 53 | 47 | 44 | 42 | 36 | 33 |
| FeO | 2 | 13 | 26 | 23 | 14 | 14 | 13 |
| $Al_2O_3$ | 20 | 9 | 13 | 13 | 20 | 27 | 29 |
| MgO | 13 | 17 | 11 | 12 | 17 | 15 | 19 |
| $SiO_2$ | 3 | 4 | 0.9 | 4 | 4 | 3 | 5 |
| CaO | 1 | | | 0.5 | 0.3 | | |
| $TiO_2$ | 1 | | | | | | |

The low silica chrome ore is an upgraded Transvaal Chrome Ore and is preferred where the ceramic articles are in the form of exhaust manifold liners to reduce the extent of silica-lead reactions that may take place between the liner and lead or lead compounds in the exhaust gases.

The following oxide formulations may be used in preparing ceramic articles in accordance with this invention:

TABLE I

| | Weight, percent | | |
|---|---|---|---|
| | $Al_2O_3$ | $TiO_2$ | Chrome ore |
| Composition No.: | | | |
| 1 | 90 | 5 | 5 |
| 2 | 80 | 10 | 10 |
| 3 | 70 | 15 | 15 |
| 4 | 60 | 20 | 20 |
| 5 | 50 | 20 | 30 |
| 6 | 50 | 30 | 20 |
| 7 | 40 | 45 | 15 |
| 8 | 40 | 25 | 35 |
| 9 | 30 | 60 | 10 |
| 10 | 30 | 40 | 30 |
| 11 | 30 | 25 | 45 |
| 12 | 20 | 70 | 10 |
| 13 | 20 | 45 | 35 |
| 14 | 20 | 25 | 55 |
| 15 | 10 | 75 | 15 |
| 16 | 10 | 50 | 40 |
| 17 | 10 | 25 | 65 |
| (Preferred compositions) | | | |
| 18 | 68 | 6 | 26 |
| 19 | 61 | 13 | 26 |
| 20 | 55 | 10 | 35 |
| 21 | 45 | 15 | 40 |
| 22 | 31 | 6 | 63 |
| 23 | 25 | 15 | 60 |
| 24 | 5 | 15 | 80 |
| 25 | 10 | 6 | 84 |
| 26 | 33 | 7 | 60 |

The raw materials used in making the present ceramics contain impurities in varying amounts, and such impurities may be tolerated in the composition so long as the basic properties of the resulting articles are not substantially affected.

Ceramic articles of the foregoing formulations may be prepared by known molding and forming techniques. Generally, the mixed raw material oxide powders are combined with a binder. They may then be dry pressed or are combined with a carrier liquid to form a slurry which is introduced into a mold and subjected to pressure. The green article is then fired in an oxidizing atmosphere in the sintering range of the materials, 1400° C. to 1700° C., and cooled to yield the final product.

As an example of the dry pressing technique, a 50 g. batch of any of the foregoing formulations of Table 1 may be mixed with Chlorothene (Dow Chemical Co.'s inhibited 1,1,1-trichlorethane), 3% by weight of a binder, such as a polyethylene glycol, e.g., Carbowax 4000, and a few drops of fish oil, as a deflocculant. The batch is dried, granulated, and pressed at about 5,000–10,000 p.s.i. in a ½" diameter die. The green pressed article is then fired in a gas, electric or other furnace in an oxidizing atmosphere.

In the slurry technique, such as the one decribed in U.S. Pat. No. 3,330,892 issued July 11, 1967, in the name of E. Herrmann, a batch of any of the formulations from Table 1 may be mixed with p-dichlorobenzene in an amount of about 20 gms. per 100 gms. of the batch. To this mixture there is added about 1 gm. per 100 gms. of batch of a deflocculant, such as, zinc stearate, and a like amount of a binder, such as, a polyethylene glycol, e.g., Carbowax 20M. The raw batch, having about 70% solids by volume, may then be pressed at about 3,000 p.s.i. to form a green article of the desired shape which is then fired in an oxidizing atmosphere. Articles may also be formed from the same slurry by injection molding, for example, at about 6,000 p.s.i.

The following are detailed examples of the preparation of ceramic articles in accordance with the invention:

*Example 1.*—200 gms. of low silica chrome ore [Majac milled to an A.P.S. (average particle size) of 1.1 microns], 400 gms. of low silica chrome ore (A.P.S. 4.0 microns), 840 gms. $Al_2O_3$ (Norton 38 Alundum, 220 grit), 420 gms. $Al_2O_3$ (ALCOA A-2, —325 mesh), 140 gms. $TiO_2$ (Titanium Alloy Mfg, Frit Makers $TiO_2$), 259 gms. of para-dichlorobenzene, 20 gms. of a polyethylene glycol binder, specifically Carbowax 20M, and 40 gms. of zinc stearate were mixed in a one gallon kneading-type mixer at 80° C. The batch was then transfer molded into parts at 5,000 p.s.i. The parts were fired at 1650° C., for 5 hours in a gas-fired furnace in an oxidizing atmosphere.

*Example 2.*—14 gms. of low silica chrome ore (A.P.S. 7.0 microns), 4 gms. of $Al_2O_3$ (ALCOA A-2, —325 mesh), and 2 gms. of $TiO_2$ (Titanium Alloy Mfg., Frit Makers $TiO_2$) were hand mixed in enough Chlorothene (Dow Chemical Co.'s inhibited 1,1,1-Trichlorethane), to make a slurry. This was dried and the powder pressed at 10,000 p.s.i. into parts. These were fired at 1650° C., for 2 hours in a gas-fired furnace in an oxidizing atmosphere.

*Example 3.*—5 gms. of low silica chrome ore (A.P.S. 1.1 microns), 13.75 gms. $Fe_2O_3$ (Columbian Carbon Co. Mapico Red 516, Med.), 13.75 gms. $Al_2O_3$ (ALCOA A-2, -325 mesh), 17.5 gms. $TiO_2$ (Titanium Alloy Mfg. Frit Makers $TiO_2$) and 1.5 gms. of a polyethylene glycol binder, specifically Carbowax 4000, were hand mixed together in Chlorothene (Dow Chemical Co.'s inhibited 1,1,1-Trichlorethane) to make a slurry. This was dried and the powder pressed at 10,000 p.s.i. into parts. The parts were fired in a gas furnace at 1500° C., for 2 hours in an oxidizing atmosphere.

*Example 4.*—100 gms. of a batch comprising, on a percent by weight basis, 20% $Al_2O_3$, 7% $TiO_2$, and 73% Chrome Ore were mixed with 14.0 gms. p-dichlorobenzene, 1.0 g. of zinc stearate, and 1.0% of a polyethylene glycol binder, specifically Carbowax 20M, to give a raw batch having an average density of about 4.32 g./cc. and a solids content of 71.0% on a volume basis. The resulting slurry was injection molded at 6,000 p.s.i. The green molded article was fired at 1600° C. for 2 hours in an oxidizing atmosphere.

*Example 5.*—500 gms. of a batch comprising, on a percent by weight basis, 73% Chrome Ore, 5% $Al_2O_3$, 7% $TiO_2$ and 15% ZnO were dry mixed together by ball milling for 15 minutes. Four gms. of a polyethylene glycol binder, specifically Carbowax 4000, per 100 gms. of batch were then added by making a slurry with Chlorothene (Dow Chemical Co.'s inhibited 1,1,1-Trichlorethane). This was dried and the powder pressed at 10,000 p.s.i. into parts. These parts were fired in a gas furnace at 1650° C., for 2 hours in an oxidizing atmosphere.

The ceramic articles produced in accordance with this invention withstand thermal shock testing in which a bar, approximately 1″ x 6″ x ⅛″, constantly stressed at about 150 p.s.i., is exposed at its mid-point to gases at 1400° C. After two minutes exposure, it is allowed to cool under room temperature conditions for at least five minutes, thus completing one thermal shock cycle. For example, a specimen made in accordance with this invention, having the composition of Composition No. 26, Table 1, withstands 33 such thermal shock cycles without failure after which testing was discontinued.

Microscopic examination of ceramic articles prepared in accordance with the invention clearly reveals grain boundary and intracrystalline cracking.

What is claimed is:

1. A ceramic article of the $R_xO_y$-$TiO_2$-Chrome Ore system which is characterized by grain boundary and intracrystalline cracking and resistance to extreme thermal shock and corrosion by exhaust gases, said article having the composition analytically defined, on a percent by weight basis, by the area within and along the boundaries of the FIGS. A, B, C, D, E, F, G, H, I of the ternary compositional diagram of the accompanying drawing where $R_xO_y$ is selected from the group consisting of (1) $Al_2O_3$, (2) $Al_2O_3+Fe_2O_3$ where $Fe_2O_3$ does not exceed 44.0 wt. percent, (3) $Al_2O_3+ZnO$ where ZnO does not exceed 90.6 wt. percent, and (4) $Al_2O_3+Fe_2O_3+ZnO$ where $Fe_2O_3$ does not exceed 44.0 wt. percent and ZnO does not exceed 90.6 wt. percent.

2. A ceramic article as defined in claim 1 wherein said composition is within the area and along the boundaries of the FIGS. J, K, L, M, C, D of the ternary compositional diagram of the accompanying drawing where $R_xO_y$ is selected from the group consisting of (1) $Al_2O_3$, (2) $Al_2O+Fe_2O_3$ where $Fe_2O_3$ does not exceed 41.5 wt. percent, (3) $Al_2O_3+ZnO$ where ZnO does not exceed 62.9 wt. percent, and (4) $Al_2O_3+Fe_2O_3+ZnO$ where $Fe_2O_3$ does not exceed 41.5 wt. percent and ZnO does not exceed 62.9 wt. percent.

3. A ceramic article as defined in claim 1 wherein $R_xO_y$ is solely $Al_2O_3$.

4. A ceramic article as defined in claim 2 wherein $R_xO_y$ is solely $Al_2O_3$.

References Cited

UNITED STATES PATENTS 3,184,322  5/1965  Parikh et al. _____ 106—59

JAMES E. POER, Primary Examiner

U.S. Cl. X.R.

106—60, 62, 65, 66